(12) United States Patent
Maniero et al.

(10) Patent No.: US 10,214,272 B2
(45) Date of Patent: Feb. 26, 2019

(54) BOAT DRIVE

(71) Applicant: ZF Friedrichshafen AG, Friedrichshafen (DE)

(72) Inventors: Loris Maniero, Abano Terme (IT); Alberto Frigo, Monticello Conte Otto (IT); Massimo Tranquillini, Mori (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 486 days.

(21) Appl. No.: 14/898,147

(22) PCT Filed: Jun. 4, 2014

(86) PCT No.: PCT/EP2014/061522
§ 371 (c)(1),
(2) Date: Dec. 14, 2015

(87) PCT Pub. No.: WO2015/003855
PCT Pub. Date: Jan. 15, 2015

(65) Prior Publication Data
US 2016/0129982 A1    May 12, 2016

(30) Foreign Application Priority Data

Jul. 9, 2013  (DE) .................. 10 2013 213 434

(51) Int. Cl.
*B63H 21/34* (2006.01)
*F01N 3/04* (2006.01)
(Continued)

(52) U.S. Cl.
CPC .............. *B63H 21/34* (2013.01); *B63H 1/14* (2013.01); *B63H 20/245* (2013.01); *B63H 20/26* (2013.01);
(Continued)

(58) Field of Classification Search
CPC .................................................. B63H 20/245
See application file for complete search history.

(56) References Cited

U.S. PATENT DOCUMENTS 4,600,395 A * 7/1986 Pichl ...................... B63H 20/10
                                                440/112
4,764,136 A * 8/1988 Johansson ............ B63H 20/245
                                                440/89 A
(Continued)

FOREIGN PATENT DOCUMENTS

DE    35 42 557 A1    11/1986
GB    2 174 659 A     11/1986
GB       2174659 A *  11/1986  ........... B63H 20/245

OTHER PUBLICATIONS

International Search Report Corresponding to PCT/EP2014/061522 dated Oct. 22, 2014.
(Continued)

*Primary Examiner* — Lars A Olson
*Assistant Examiner* — Jovon E Hayes
(74) *Attorney, Agent, or Firm* — Davis & Bujold PLLC; Michael J. Bujold

(57) ABSTRACT

A boat drive including combustion engine located within the hull and a drive unit located outside the hull. The drive has a propeller shaft and an exhaust system with an exhaust duct and an outlet. The exhaust duct connects the engine to the exhaust outlet for carrying away exhaust gases from the engine and cooling water introduced into the exhaust duct. The exhaust outlet is arranged in the propeller shaft. A first exhaust release opening is arranged in the exhaust duct, between the engine and the exhaust outlet, so that during operation, a first fraction of the exhaust gases and cooling water is discharged through the first exhaust release opening, while a second fraction of the exhaust gases and the cooling water is discharged through the exhaust outlet. A device is (Continued)

provided for adjusting the first fraction that can be discharged through the first exhaust release opening.

10 Claims, 3 Drawing Sheets

(51) Int. Cl.
| | |
|---|---|
| *F01N 13/00* | (2010.01) |
| *F01N 13/12* | (2010.01) |
| *B63H 20/24* | (2006.01) |
| *B63H 20/26* | (2006.01) |
| *B63H 1/14* | (2006.01) |
| *B63H 21/14* | (2006.01) |
| *B63H 21/38* | (2006.01) |

(52) U.S. Cl.
CPC ........... *B63H 21/14* (2013.01); *B63H 21/383* (2013.01); *F01N 3/04* (2013.01); *F01N 13/004* (2013.01); *F01N 13/12* (2013.01); *F01N 2590/02* (2013.01); *F01N 2610/00* (2013.01); *Y02T 10/20* (2013.01)

(56) References Cited

U.S. PATENT DOCUMENTS

| | | | | |
|---|---|---|---|---|
| 4,831,822 | A * | 5/1989 | Yoshimura | F01N 13/004 440/88 J |
| 5,421,756 | A * | 6/1995 | Hayasaka | B63H 20/245 416/93 A |
| 7,387,556 | B1 * | 6/2008 | Davis | B63H 20/26 440/112 |
| 8,808,045 | B2 * | 8/2014 | Lundqvist | B63H 21/32 440/89 A |
| 2016/0129982 | A1 * | 5/2016 | Maniero | F01N 3/04 440/89 B |

OTHER PUBLICATIONS

Written Opinion Corresponding to PCT/EP2014/061522 date Oct. 22, 2014.

International Preliminary Report on Patentability Corresponding to PCT/EP2014/061522 dated Jun. 10, 2015.

* cited by examiner

BOAT DRIVE

This application is a National Stage completion of PCT/EP2014/061522 filed Jun. 4, 2014, which claims priority from German patent application serial no. 10 2013 213 434.7 filed Jul. 9, 2013.

FIELD OF THE INVENTION

The invention concerns a boat drive.

BACKGROUND OF THE INVENTION

A boat drive of this type is also called a stern drive or rear drive. In a stern drive an internal combustion engine is arranged on the inside of a vessel's hull and the drive-train passes through a transom of the hull, so that the remainder of the drive-train, in the form of a drive unit, is outside the hull. To enable steering of the travel direction the drive unit can be pivoted about an approximately vertical steering axis. The propeller shaft of the drive unit then also swivels and the thrust vector produced by the rotating propellers changes its direction, whereby the travel direction of the boat also changes.

Exhaust-gas systems for stern drives are known, which are cooled with cooling water. In such cases the cooling water is passed into the exhaust-gas system and at least in part discharged together with the exhaust gases below the surface of the water. For example, the exhaust gases and the cooling water pass through an exhaust-gas duct through the boat drive to a propeller shaft arranged on the drive output side, and are discharged through an exhaust-gas outlet in the area of the propeller shaft below the surface of the water. This reduces annoying noise emissions and prevents unpleasant effects of the exhaust gases for people on the boat.

The passage of the exhaust gases and the cooling water through the relatively long exhaust-gas duct and through the exhaust-gas outlet below the water surface give rise to a high flow resistance against the exhaust gas stream and therefore have the disadvantage that an undesired exhaust-gas counter-pressure acts upon the internal combustion engine. This reduces the drive power that can be provided by the internal combustion engine. To overcome this disadvantage DE 3542557 A1 describes a boat drive with an exhaust-gas system in which the counter-pressure of the exhaust gas is relieved, in that the exhaust gases do not pass through the whole of the exhaust-gas duct and the outlet located below the water's surface, but are instead discharged to the outside air through an exhaust-gas release duct above water level.

SUMMARY OF THE INVENTION

The purpose of the present invention is to further improve a boat drive of the type described at the start with its exhaust-gas system.

This objective is achieved by an exhaust-gas system for a boat drive as described below.

Thus, the present invention concerns a boat drive that comprises an internal combustion engine arranged on the inside of a vessel's hull, a drive unit with a propeller shaft arranged outside the hull, and exhaust-gas system with an exhaust-gas duct and an exhaust-gas outlet. The exhaust-gas duct connects the internal combustion engine to the exhaust-gas outlet in order to discharge exhaust gases from the internal combustion engine along with cooling water introduced into the exhaust-gas duct. In this case the exhaust-gas outlet is located in the propeller shaft and is therefore below the surface of the water when the boat is in the water.

To reduce the exhaust-gas counter-pressure described earlier, a first exhaust-gas release opening is arranged in the exhaust-gas duct between the internal combustion engine and the exhaust-gas outlet. During operation a first fraction of the exhaust gases and cooling water is discharged through the first exhaust-gas release opening and a second fraction of the exhaust gases and cooling water is discharged via the exhaust-gas outlet. According to the invention, means are provided for adjusting the first fraction that can be discharged via the fist exhaust-gas release opening.

The means for adjusting the first fraction that can be discharged via the fist exhaust-gas release opening enable the exhaust-gas system to be adapted simply and quickly to specific operating conditions of the boat, which can also change over the life of the boat. At the time when a boat drive and the boat for which it is intended are developed and built, as a rule not all the operating conditions of the later operation of the boat are known. Often, for cost reasons a component such as part of a drive system or an exhaust-gas system for different boat sizes and boat versions is used. For example, the same exhaust-gas system is used for various internal combustion engine sizes. In that case fixed specified dimensions and shapes in the area an exhaust-gas release opening have the disadvantage that they are not ideal for every boat and any operating conditions in which they may be used. Accordingly, the possibility according to the invention of quickly adapting the first fraction of exhaust gases and cooling water that can be discharged via the first exhaust-gas release opening is a substantial advantage of the present invention. In that way the division of the exhaust-gas and cooling water fractions be adapted in a simple manner to the current conditions with a view to the optimum use of the internal combustion engine's power, low operating noise emission and low exhaust-gas pollution in the area of the boat.

Preferably, the adjustment means comprise an adjusting baffle arranged at least partially in the exhaust-gas duct, which can be fixed in various positions. Such an adjusting baffle is preferably arranged so that it can be moved in the exhaust-gas duct and divides the exhaust gases and cooling water in the exhaust-gas duct into the first and second fractions of exhaust gases and cooling water. Accordingly the adjusting baffle that projects partially into the exhaust gas stream consisting of exhaust gases and cooling water diverts a greater or lesser fraction of the exhaust gas stream, so that this first fraction is discharged through the first exhaust-gas release opening.

A simple embodiment of the adjusting baffle arranged movably in the exhaust-gas duct consists of a simple plate with slots by virtue of which the plate can be fixed in the desired position in the exhaust-gas system by means of fixing bolts. To reposition the adjusting baffle, it is then only necessary to loosen the fixing bolts, move the plate and re-tighten the fixing bolts. It is also conceivable to reposition the adjusting baffle with the help of an auxiliary force, for example with the help of an electric, pneumatic or hydraulic actuator. This allows the adjusting baffle to be adjusted even while the boat is being operated. Alternatively, adjusting baffles of various shapes or dimensions can also be kept ready for fixing on to first exhaust-gas release opening, in order by exchanging the adjusting baffles to adjust or readjust the first fraction of exhaust gases and cooling water that can be discharged through the first exhaust-gas release openings.

Preferably, the adjusting baffle is arranged in the exhaust-gas duct in such manner that by virtue of the action of gravity and centrifugal force on the cooling water, the first fraction contains more of the cooling water than does the second fraction. In this way most of the cooling water introduced into the exhaust-gas duct can be discharged through the first release opening and does not have to pass along the whole of the long duct as far as the exhaust-gas outlet in the propeller shaft. With some internal combustion engines several hundred liters of cooling water per minute have to pass through the system, so that a high exhaust-gas counter-pressure would be produced if the total amount of all this cooling water had to pass through the whole of the long exhaust-gas duct as far as the outlet in the propeller shaft. Owing to its lower flow resistance the greater part of the exhaust gases without cooling water can pass more easily through the long exhaust-gas duct as far as the exhaust-gas outlet in the propeller shaft. Having regard to the exhaust gas and noise effects on the people on the boat, it is also advantageous for as small as possible a fraction of the exhaust gases to emerge from the first exhaust-gas release opening and as large a fraction as possible of the exhaust gases to emerge through the outlet opening in the propeller shaft, which is under the water surface and farther away from the people on the boat.

The adjusting means are preferably arranged in a duct section of the exhaust-gas duct attached on the rear transom, and the at least one first exhaust-gas release opening is positioned in the area of the rear transom. Coming from the internal combustion engine, the exhaust-gas duct passes through the transom to the drive unit arranged outside the boat's hull. In current designs of the exhaust-gas system the end of the exhaust-gas system nearest the engine often consists of several exhaust-gas tubes, which are brought together in the duct section attached to the transom and passing through it. The first possibility for discharging a first fraction of the exhaust gases and cooling water to the outside along the course of the exhaust-gas duct is provided by such a duct section fixed to the transom of the boat.

Preferably, the first exhaust-gas release opening is positioned in the boat drive in such manner that at least when the boat is traveling smoothly, the opening is arranged above the surface of the water. When the boat is at rest or moving at low speeds, for example when the boat is being maneuvered, the boat hull and the boat drive lie lower in the water than at higher travel speeds, when the boat is traveling smoothly (planing) on the water. In the context of the present invention the water level difference at the boat drive at low and high speeds is made use of, in that at low speeds the exhaust-gas release openings are underwater, so that the noise level and the exhaust-gas pollution above the surface of the water are very slight. At low travel speeds the power called for from the internal combustion engine is also low, so the quantities of exhaust gases and cooling water are also small. Thus, at low travel speeds the problem of exhaust-gas counter-pressure described earlier does not occur, or only so to a small extent.

When the travel speed is increased the boat rises a little farther out of the water, and above a certain speed the boat planes on the surface of the water, so that the exhaust-gas release openings are located above the surface of the water. Accordingly, the exhaust gases and the cooling water can emerge from the exhaust-gas release openings with no further resistance, and this reduces the exhaust-gas counter-pressure considerably. These effects are so pronounced because precisely at high travel speeds, the internal combustion engine has to generate high drive powers. During this, large amounts of exhaust gases and cooling water have to be discharged through the exhaust-gas system and the problem of exhaust-gas counter-pressure is acute. In contrast, the higher noise emission and the emergence of exhaust gases from the exhaust-gas release openings are less perceptible on the boat at high travel speeds.

A further preferred design of the invention provides that in addition to the first exhaust-gas release opening at least one second exhaust-gas release opening is provided in the drive unit between the first exhaust-gas release opening and the exhaust-gas outlet, so that a third fraction of the exhaust gases and cooling water emerges through the second exhaust-gas release opening. In this case, for example, a respective second exhaust-gas release opening can be provided on each side of the drive unit, i.e. on the port and starboard sides. Preferably, means for adjusting the third fraction of exhaust gases and cooling water that can be discharged are also provided at the exhaust-gas release opening(s).

These means for adjusting the third fraction preferably include a cover-plate by means of which the aperture size of the second exhaust-gas release opening can be adjusted. For example, the cover-plate can be provided with slots by virtue of which the cover-plate can be fixed in a particular, desired position on the exhaust-gas system or on the drive unit by means of fastening bolts, so that the cover-plate leaves open a particular fraction of the maximum area of the second exhaust-gas release opening and covers or closes off the rest of it. Alternatively, cover-plates with perforations of different sizes can be fixed over the exhaust-gas release opening in order, in that way, to adjust the size of the third fraction of exhaust gases and cooling water that can be discharged through the second exhaust-gas release opening.

Preferably, the second exhaust-gas release opening is also positioned on the boat drive in such manner that at least when the boat is traveling smoothly the opening is arranged above the surface of the water. This has the same advantages as those already described above for the first exhaust-gas release opening.

The various fractions of exhaust gas and cooling water discharged through the exhaust-gas release openings, and their effects on the noise emission and the drive power delivered by the internal combustion engine, can in practice be simply tested and determined during test drives in order to achieve an optimum adjustment of the fractions. The fractions of exhaust gas and cooling water that can be discharged through the first and second exhaust-gas release openings can for example be determined or measured in the form of a percentage fraction of the total volume flow or mass of exhaust gas and cooling water passing through the exhaust-gas duct.

BRIEF DESCRIPTION OF THE DRAWINGS

Below, the invention and its further advantages are explained in greater detail with reference to the associated figures.

DETAILED DESCRIPTION OF THE PREFERRED EMBODIMENTS

Figure 1:
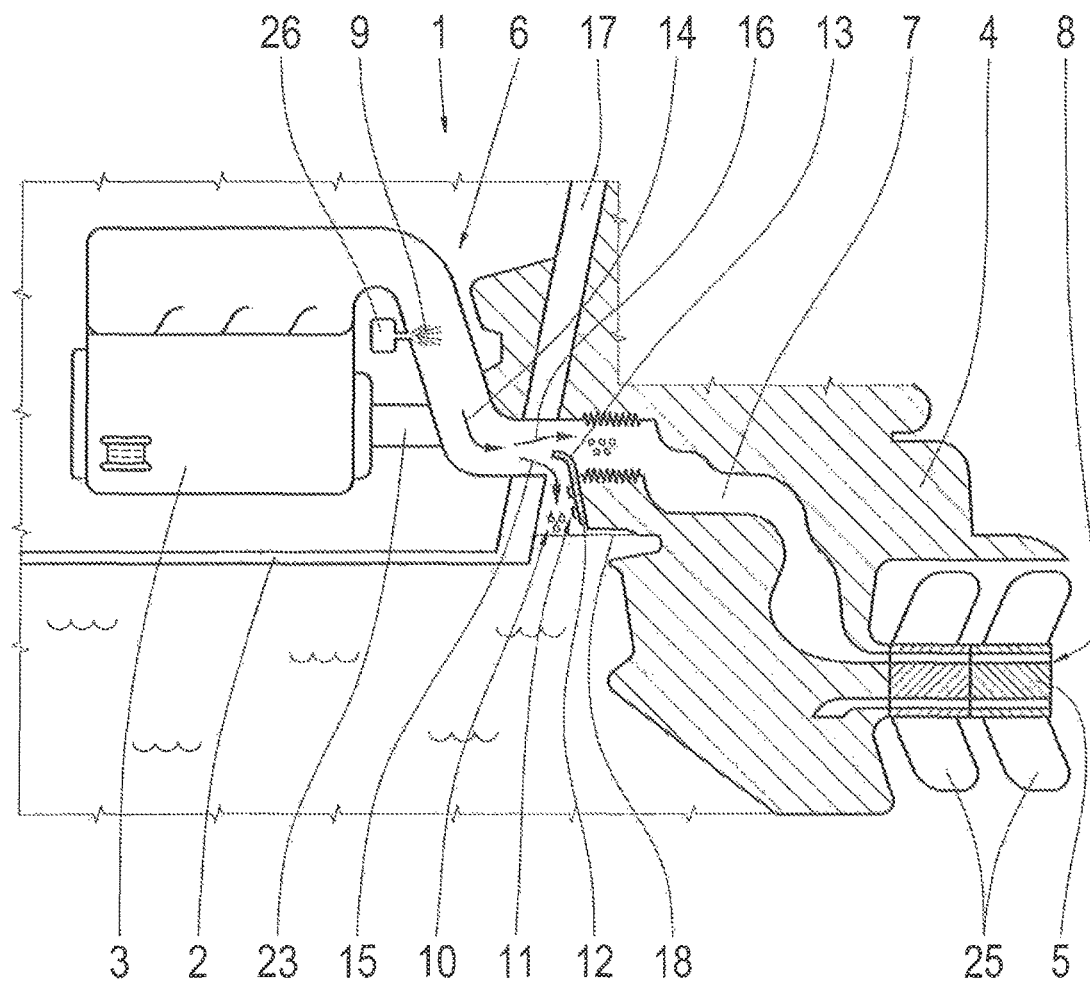
FIG. 1: Shows a schematic representation of a first embodiment of a boat drive according to the invention.

The boat drive 1 shown in FIG. 1 comprises an internal combustion engine 3 arranged inside a vessel's hull 2 and a drive unit 4 with a propeller shaft 5 arranged outside the vessel's hull 2. Two propellers 25 are arranged on the propeller shaft 5. In addition the boat drive comprises an exhaust-gas system 6 having an exhaust-gas duct 7 and an exhaust-gas outlet 8. The exhaust-gas outlet 8 is arranged in the propeller shaft 5. By way of shafts and gears (not shown), an engine driveshaft 23 drives the propeller shaft 5. Such mechanical drive-trains for stern-drive boat drives are known. Accordingly, here the mechanical drive-train is not described and illustrated in further detail. The drive unit 4 is shown in cross-section in FIGS. 1 and 2 in order to make it possible to see the details of the exhaust-gas system 6 and the exhaust-gas duct 7. The exhaust-gas duct 7 connects the internal combustion engine 3 to the exhaust-gas outlet 8 in order to enable the discharge of exhaust gases from the internal combustion engine 3 and of cooling water 9 that has been introduced into the exhaust-gas duct 7. The cooling water 9 is introduced into the exhaust-gas duct 7 by way of a cooling water inlet 26, a short distance after the exhaust gases have emerged from the internal combustion engine 3.

A first exhaust-gas release opening 10 is arranged in the exhaust-gas duct 7 between the internal combustion engine 3 and the exhaust-gas outlet 8. During operation a first fraction 15 of the exhaust-gas stream 14 is discharged through this first exhaust-gas release opening 10. A second fraction 16 of the exhaust gases and the cooling water 9 is discharged through the exhaust-gas outlet 8. The exhaust-gas stream 14 includes exhaust gases from the internal combustion engine 3 and the cooling water 9 introduced into the exhaust-gas duct 7. The exhaust-gas stream 14 and the first, second and third fractions 15, 16 and 19 are represented symbolically in the figures by arrows.

At the first exhaust-gas release opening 10, means 11 are provided for adjusting the first fraction 15 that can be discharged through the first exhaust-gas release opening. In the embodiment shown the adjusting means 11 are in the form of an adjusting baffle 12 arranged in part in the exhaust-gas duct 7. The adjusting baffle 12 can be set in various positions. That is to say, depending on the adjustment in each case the free end 13 of the adjusting baffle 12 projects farther or less far into the exhaust-gas duct 7. At its free end 13 the adjusting baffle 12 is curved in the direction opposite to the exhaust-gas stream 14 and divides the exhaust-gas stream 14 with the cooling water 9 into the first fraction 15 and the second fraction 16.

The adjusting baffle 12 is arranged so that it can be moved in the exhaust-gas duct 7, and divides the exhaust-gas stream 14 into the first fraction 15 and the second fraction 16. In this case the adjusting baffle 12 is arranged in the exhaust-gas duct 7 in such manner that by virtue of the gravitational and centrifugal forces acting on the cooling water 9, the first fraction 15 contains more of the cooling water 9 than does the second fraction 16. The free end 13 of the adjusting baffle 12 forms a horizontally extending edge which divides the exhaust-gas stream 14. Below the edge the first fraction 15 flows, together with the substantially larger part of the cooling water 9, through the first exhaust-gas release opening 10 into the surroundings. Above the edge the second fraction 16 of the exhaust-gas stream 14, which consists mainly of exhaust gases and a smaller fraction of the cooling water 9, flows farther on through the exhaust-gas duct 7 toward the exhaust-gas outlet 8. In the area of the adjusting baffle 12 gravity and the centrifugal force act upon the cooling water in approximately the same direction because a short distance before the adjusting baffle 12 the exhaust-gas duct 7 has a curvature such that, coming from above, it deviates to an approximately horizontal direction.

The first exhaust-gas release opening 10 is positioned in the area of the transom 17 of the boat's hull 2. For that purpose the adjusting baffle 12 is attached to a section of the exhaust-gas duct 7 which is fixed to the transom 17. The means of attaching the duct section to the transom 17 are not shown in FIG. 1.

The first exhaust-gas release opening 10 is positioned in the boat drive 1 in such manner that when the boat is traveling smoothly the opening is above the surface 18 of the water. FIG. 1 shows the position of the hull 2 and the boat drive 1 relative to the water's surface 18 when the boat is traveling smoothly. In contrast, when the boat is moving slowly or the boat is at rest the hull 2 and the boat drive 1 are deep enough in the water for the first and second exhaust-gas release openings 10 and 20 to be below the surface 18 of the water.

Figure 2:
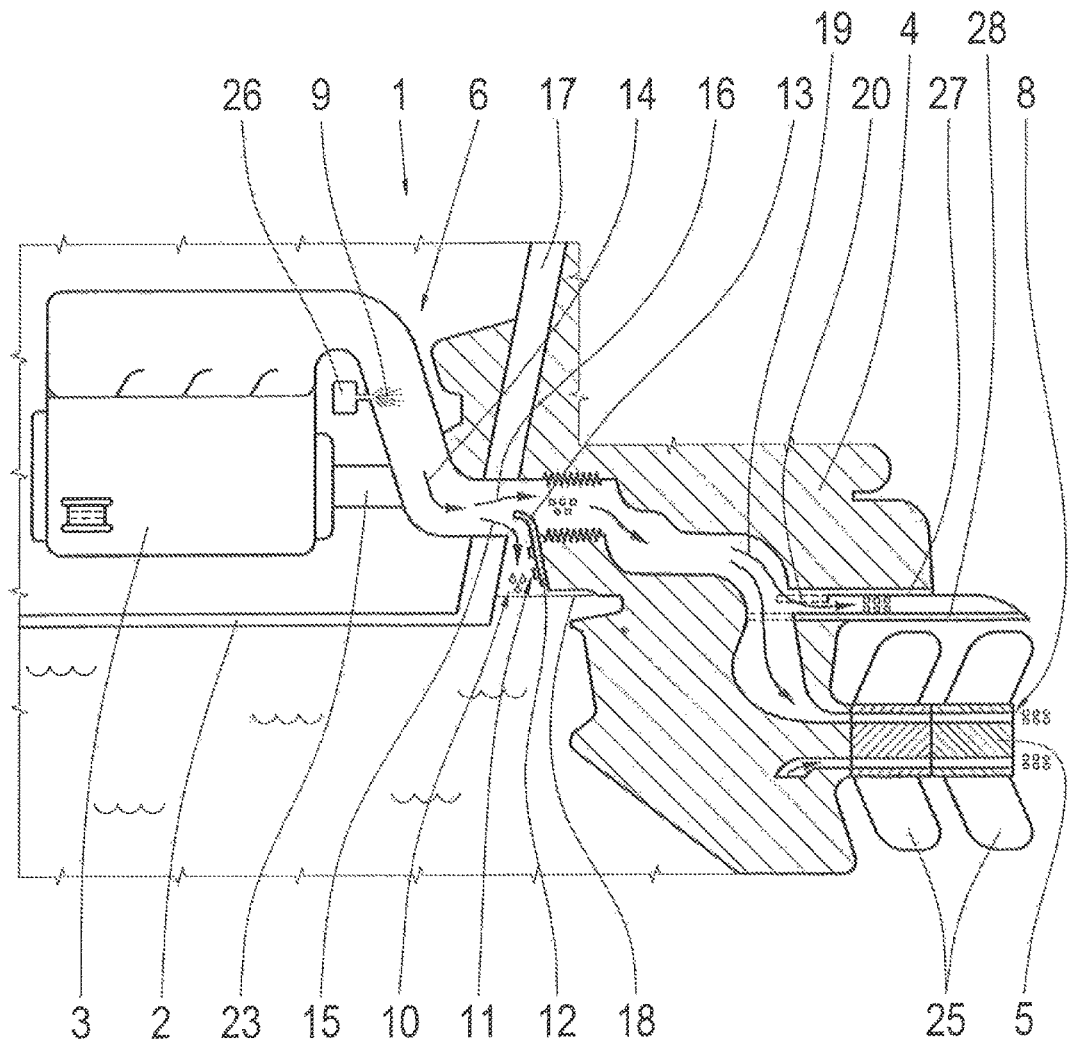
FIG. 2: Shows a schematic representation of a second embodiment of a boat drive according to the invention.

FIG. 2 shows a second embodiment of the invention in which, in addition to the first exhaust-gas release opening 10, the exhaust-gas system has a second exhaust-gas release opening 20. In other respects the first and second embodiments of the invention are the same, for which reason those elements already described with reference to FIG. 1 will not be described again here. In the two figures the same elements are indexed using the same numbers.

Advantageously, on each side of the drive unit 4 there is arranged a respective second exhaust-gas release opening 20, of which only one can be seen in FIG. 2. The second exhaust-gas release openings 20 are arranged in the drive unit 4 between the first exhaust-gas release opening 10 and the exhaust-gas outlet 8, so that during operation a third fraction 19 of the exhaust-gas stream 14, consisting of exhaust gases and cooling water 9, is discharged through the second exhaust-gas release opening 20.

At the second exhaust-gas release opening 20, means 21 are provided for adjusting the third fraction 19 of exhaust gas and cooling water 9 that can be discharged through the second exhaust-gas release opening 20. These means 21 for adjusting the third fraction 19 are in the form of a cover-plate 22. With the help of the cover-plate 22 the second exhaust-gas release opening 20 can be adjusted to a definite aperture size. Other cover-plates with perforation dimensions different from the cover-plate 22 shown in FIG. 4 can simply be exchanged for the cover-plate 22 shown, in order to vary the third fraction 19.

The second exhaust-gas release opening 20 is also positioned in the boat drive 1 in such manner that at least during smooth traveling of the boat the opening is above the water surface 18. FIG. 2 also shows the position of the boat's hull 2 and the boat drive 1 relative to the water surface 18 when the boat is traveling smoothly.

Figure 3:
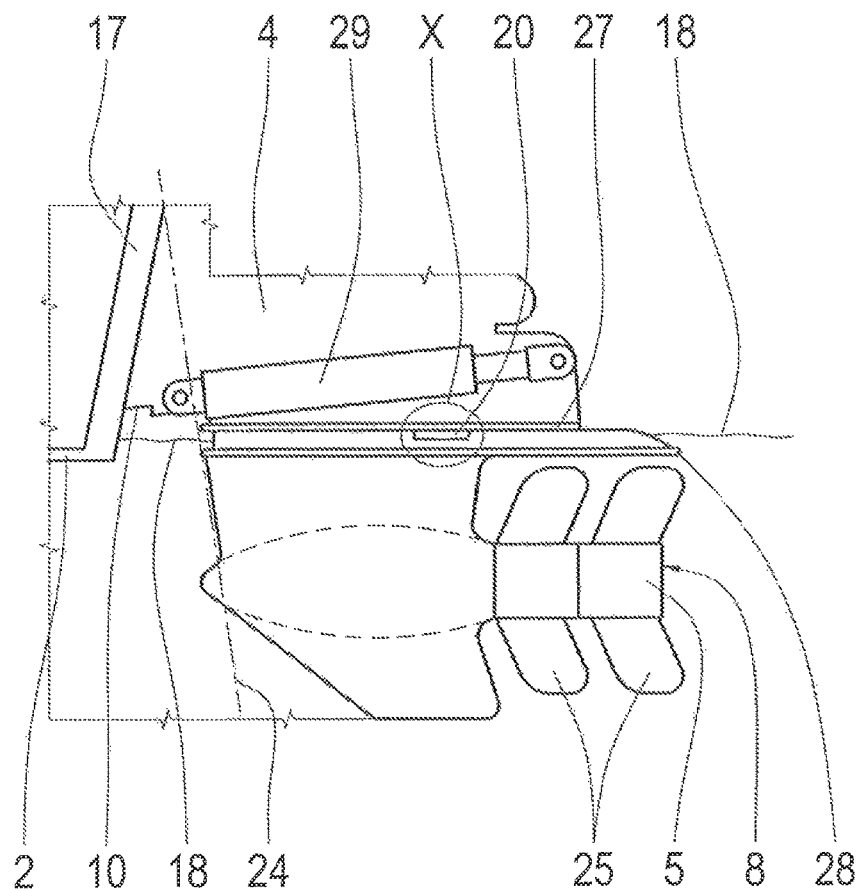
FIG. 3: Shows a schematic representation of the drive unit of the second embodiment of the boat drive according to the invention.

FIG. 3 shows the second embodiment of the invention wherein, in contrast to FIGS. 1 and 2, the drive unit 4 of the boat drive 1 according to the invention is not shown in cross-section. For the purpose of steering in the travel direction, the drive unit 4 can be pivoted about an approximately vertical steering axis 24. The pivoting movement is actuated by a respective piston-cylinder unit 29 arranged on each side of the drive unit 4. This also swivels the propeller shaft 5 of the drive unit 4 so that the thrust vector produced by the rotating propellers 25 changes its direction, so that the travel direction of the boat also changes. In this embodiment the steering axis is inclined by a few degrees relative to the vertical.

The second exhaust-gas release opening 20 is arranged in the area of the drive unit 4 between an upper deflector plate 27 and a lower deflector plate 28. When the boat is planing on the water at a higher travel speed, as shown in all the figures, then the second exhaust-gas release opening 20 too is just above the water surface 18.

Figure 4:
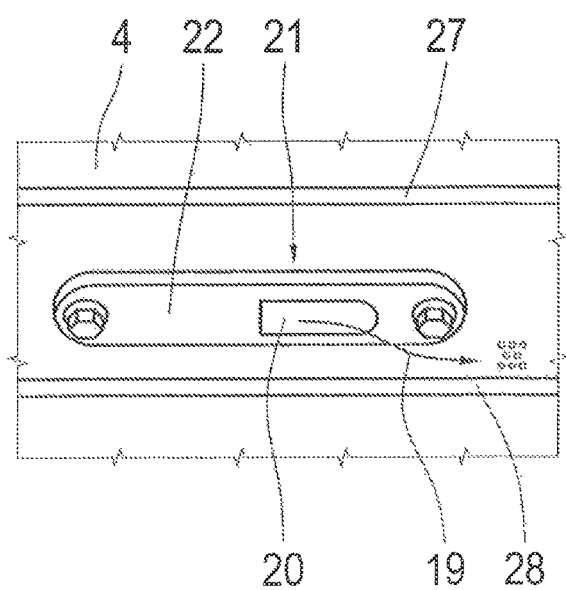
FIG. 4: Shows a detail section X of FIG. 3.

FIG. 4 shows an enlarged representation of the area X. In this it can be seen that as the means 21 for adjusting the third fraction 19 a cover-plate 22 is used. The cover-plate 22 is bolted in place over the second exhaust-gas release opening 20 in the drive unit 4 between the upper deflector plate 27 and the lower deflector plate 28. The cover-plate 22 exposes a certain area of the second exhaust-gas release opening 20, by virtue of which the size of the third fraction 19 of the exhaust-gas stream is determined. The size of the third fraction 19 can be changed by replacing the cover-plate 22 shown with another cover-plate having a different exhaust-gas release aperture size 20. A larger exhaust-gas release opening 20 increases the third fraction 19 whereas a smaller exhaust-gas release opening 20 reduces the third fraction 19.

INDEXES

1 Boat drive
2 Hull of the boat
3 Internal combustion engine
4 Drive unit
5 Propeller shaft
6 Exhaust-gas system
7 Exhaust-gas duct
8 Exhaust-gas outlet
9 Cooling water
10 First exhaust-gas release opening
11 Adjusting means
12 Adjusting baffle
13 Free end
14 Exhaust-gas stream
15 First fraction
16 Second fraction
17 Rear transom
18 Water surface
19 Third fraction
20 Second exhaust-gas release opening
21 Adjusting means
22 Cover-plate
23 Engine driveshaft
24 Steering axis
25 Propeller
26 Cooling water feed
27 Upper deflector plate
28 Lower deflector plate
29 Piston-cylinder unit

The invention claimed is:

1. A boat drive comprising:
  an internal combustion engine being arranged within a hull of a vessel,
  a drive unit, having a propeller shaft, being arranged outside the hull of the vessel,
  an exhaust-gas system with an exhaust-gas duct and an exhaust-gas outlet,
  the exhaust-gas duct connecting the internal combustion engine to the exhaust-gas outlet for carrying away exhaust gases from the internal combustion engine and cooling water being introduced into the exhaust-gas duct, the exhaust-gas outlet being arranged in the propeller shaft, and a first exhaust-gas release opening being arranged in the exhaust-gas duct, between the internal combustion engine and the exhaust-gas outlet,
  during operation, a first fraction of the exhaust gases and the cooling water being discharged through the first exhaust-gas release opening, while a second fraction of the exhaust gases and the cooling water being discharged through the exhaust-gas outlet, and
  an adjusting means being provided for adjusting the first fraction that is discharged through the first exhaust-gas release opening, the adjusting means including an adjusting baffle arranged at least partially in the exhaust-gas duct, and the adjusting baffle being adjustable, during operation of the boat drive, to various positions within the exhaust-gas duct such that a ratio of the first fraction to the second fraction is adjustable based on the various positions of the adjusting baffle.

2. The boat drive according to claim 1, wherein the adjusting baffle is movably arranged within the exhaust-gas duct and divides the exhaust gases and the cooling water, in the exhaust-gas duct, into the first fraction and the second fraction.

3. The boat drive according to claim 1, wherein the adjusting baffle is arranged in the exhaust-gas duct in such manner that, by virtue of gravity and centrifugal force acting on the cooling water, the first fraction contains a larger amount of the cooling water than the second fraction.

4. The boat drive according to claim 1, wherein the adjusting means are fixed on a duct section of the exhaust-gas duct that is attachable to a transom, and the first exhaust-gas release opening is arranged in an area of the transom.

5. The boat drive according to claim 1, wherein the first exhaust-gas release opening is positioned in the boat drive so that at least when boat is traveling smoothly, the first exhaust-gas release opening is located above a surface of water on which the boat is traveling.

6. A boat drive comprising:
  an internal combustion engine being arranged within a hull of a vessel,
  a drive unit, having a propeller shaft, being arranged outside the hull of the vessel,
  an exhaust-gas system with an exhaust-gas duct and an exhaust-gas outlet,
  the exhaust-gas duct connecting the internal combustion engine to the exhaust-gas outlet for carrying away exhaust gases from the internal combustion engine and cooling water being introduced into the exhaust-gas duct, the exhaust-gas outlet being arranged in the propeller shaft, and a first exhaust-gas release opening being arranged in the exhaust-gas duct, between the internal combustion engine and the exhaust-gas outlet,
  during operation, a first fraction of the exhaust gases and the cooling water being discharged through the first exhaust-gas release opening, while a second fraction of the exhaust gases and the cooling water being discharged through the exhaust-gas outlet,
  an adjusting means being provided for adjusting an amount of the first fraction that is discharged through the first exhaust-gas release opening during operation of the boat drive, the adjusting means including an adjusting baffle arranged at least partially in the exhaust-gas duct, and the adjusting baffle being adjustable to various positions, and
  the exhaust-gas system comprises at least one second exhaust-gas release opening, which is arranged between the first exhaust-gas release opening and the exhaust-gas outlet in the drive unit so that a third fraction, of the exhaust gases and the cooling water, is discharged through the at least one second exhaust-gas release opening.

7. The boat drive according to claim 6, wherein another adjusting means, for adjusting the third fraction of exhaust gases and the cooling water dischargable through the at least one second exhaust-gas release opening, is provided over the at least one second exhaust-gas release opening.

8. The boat drive according to claim 6, wherein another adjusting means, for adjusting the third fraction, comprises at least one cover-plate by which an aperture of the at least one second exhaust-gas release opening is adjustable to various sizes.

9. The boat drive according to claim 6, wherein the at least one second exhaust-gas release opening is positioned in the boat drive in such manner that at least when a boat is traveling smoothly, the at least one second exhaust-gas release is located above a surface of water on which the boat is traveling.

10. A boat drive comprising:
an internal combustion engine arranged within a boat hull;
a drive unit arranged outside the boat hull and having a propeller shaft for driving at least one propeller;
an exhaust system comprising an exhaust duct that is connected at one end thereof to the internal combustion engine and connected at an opposite end thereof to an exhaust outlet, a cooling water inlet being located in the exhaust duct for introducing cooling water into a flow of exhaust gases from the internal combustion engine, the exhaust duct directing the flow of the exhaust gases and the water toward the exhaust outlet, and the exhaust outlet be arranged in the propeller shaft;
a first exhaust release opening being arranged in the exhaust duct, between the internal combustion engine and the exhaust-gas outlet, such that, during operation of the internal combustion engine, a first fraction of the flow of exhaust gases and the water being discharged from the exhaust duct through the first exhaust release opening while a second fraction of the flow of exhaust gases and the water being discharged from the exhaust duct through the exhaust-gas outlet; and
an adjustment member being arranged at least partially within the exhaust duct and being adjustable during operation of the boat drive to a plurality of positions for adjusting an amount of the first fraction of the flow of the exhaust gases and the water discharged from the exhaust duct through the first exhaust release opening.

* * * * *